United States Patent [19]

Meckstroth et al.

[11] Patent Number: 5,131,889
[45] Date of Patent: Jul. 21, 1992

[54] AUTOMOTIVE ENGINE ACCESSORY DRIVE TENSIONER

[75] Inventors: Richard J. Meckstroth, Northville; Timothy T. Vaughn, Dearborn, both of Mich.

[73] Assignee: Ford Motor Company, Dearborn, Mich.

[21] Appl. No.: 600,652

[22] Filed: Oct. 22, 1990

[51] Int. Cl.⁵ .............................................. F16H 7/14
[52] U.S. Cl. ..................................... 474/117; 474/135
[58] Field of Search ............... 474/117, 101, 109, 133, 474/135, 115

[56] References Cited

U.S. PATENT DOCUMENTS

| | | |
|---|---|---|
| 447,301 | 3/1891 | Dootson . |
| 1,232,391 | 7/1917 | Pierce . |
| 1,701,820 | 2/1929 | Morse . |
| 1,841,834 | 1/1932 | McRaven . |
| 2,611,148 | 9/1952 | Rappl . |
| 3,136,170 | 6/1964 | Murray . |
| 3,707,092 | 12/1972 | Piech ................................ 474/101 |
| 3,975,965 | 8/1976 | Speer ............................... 474/135 |
| 4,031,761 | 6/1977 | Fisher et al. ....................... 474/87 |
| 4,144,772 | 3/1979 | Brackin et al. ................... 474/135 |
| 4,145,934 | 3/1979 | Sragal ............................... 474/135 |
| 4,285,676 | 8/1981 | Kraft ................................. 474/135 |
| 4,351,636 | 9/1982 | Hager ................................ 474/135 |
| 4,392,840 | 7/1983 | Radocaj ............................ 474/117 |
| 4,557,709 | 12/1985 | St. John ............................ 474/117 |
| 4,822,322 | 4/1989 | Martin .............................. 474/135 |
| 4,826,471 | 5/1989 | Ushio ............................... 474/135 |
| 4,832,665 | 5/1989 | Kadota et al. ..................... 474/112 |
| 4,908,007 | 3/1990 | Henderson ........................ 474/135 |
| 4,934,988 | 6/1990 | Kawamura et al. ............... 474/117 |

FOREIGN PATENT DOCUMENTS

| | | |
|---|---|---|
| 2608277 | 1/1977 | Fed. Rep. of Germany . |
| 3043287 | 11/1981 | Fed. Rep. of Germany . |
| 279415 | 3/1952 | Switzerland . |

Primary Examiner—Ramon S. Britts
Assistant Examiner—Roger J. Schoeppel
Attorney, Agent, or Firm—Jerome R. Drouillard; Clifford L. Sadler

[57] ABSTRACT

An accessory drive tensioner for an engine includes a cover adapted to enclose a portion of the engine, a hub carrier formed integrally with the cover, and a tensioner arm and wheel assembly journalled to the hub carrier. The tensioner arm and wheel assembly includes a flanged hub having a clindrical center section in contact with a bearing post also formed integrally with the cover, and a generally planar cover section in contact with the annular wall.

18 Claims, 2 Drawing Sheets

AUTOMOTIVE ENGINE ACCESSORY DRIVE TENSIONER

BACKGROUND OF THE INVENTION

1. Field of the Invention

This invention relates to a device for automatically applying tension to a drive belt used in conjunction with rotating accessories mounted at the front of a vehicular engine.

2. Disclosure Information

Flexible power transmission members, such as roller chains and belts, have been used with automotive engines for many years. With either type of flexible member, it is usually desirable to maintain the tension of the member at a level sufficient to prevent slipping of the chain or belt over the various sprockets or pulleys upon which the flexible member is trained.

The slippage of chains used to drive an engine's valve gear can have disastrous results if the engine is not designed to be free-wheeling. Accordingly, the need for chain tensioning under such circumstances has been recognized for many years. U.S. Pat. No. 1,701,820 to Morse discloses a rotary chain tensioning mechanism mounted within the chain case of an engine. U.S. Pat. No. 3,136,170 to Murray discloses yet another type of spring driven chain tensioner dismounted by means of a bracket within the chain case of an engine. Finally, Swiss Patent Publication 279415 discloses a hydraulically controlled chain tensioner in which engine oil pressure acts upon an arbor upon which a tensioning sprocket is mounted.

The slipping of accessory drive belts used for the purpose of providing power to such engine accessories as a power steering pump, air conditioning compressor, and an alternator, will usually not produce disastrous results because such accessories are most often not required to operate at full rated output. Drive belt slippage will, however, occasion complaints by the driver of a vehicle should the slippage be accompanied by undesirable squealing or chirping noises. For this reason, inter alia, automotive designers have striven to avoid slipping of accessory drive belts U.S. Pat. No. 4,031,761 to Fisher et al., U.S. Pat. No. 4,145,934 to Sragal, U.S. Pat. No. 4,285,676 to Kraft, U.S. Pat. No. 4 351,636 to Hager, U.S. Pat. No. 4,392,840 to Radocaj, U.S. Pat. No. 4,557,709 to St. John, U.S. Pat. No. 4,822,322 to Martin, U.S. Pat. No. 4,908,007 to Henderson, and U.S. Pat. No. 4,934,988 to Kawamura et al, all , disclose accessory drive belt tensioning devices which are essentially added on to an engine by bolting the device to the front structure of the engine. Such devices suffer from a couple of different drawbacks. First of all, because the tensioning device is secured in most cases by means of a bracket to the engine, the securing structure generally lacks rigidity and as a result will have vibration characteristics which in many cases are less than optimal. Secondly, bracketry increases the weight, cost, and package volume of the tensioning devices, as opposed to a device according to the present invention, in which the tensioner is integrated into the front cover of an engine. It is thus an object of the present invention to provide an engine accessory drive tensioner which has superior functional characteristics in terms of its resistance to unwanted vibration.

It is another object of the present invention to provide an accessory drive tensioner which is of low mass.

It is yet another object and advantage of the present invention that a tensioner according to this invention will have a smaller package volume as compared to known tensioners.

It is yet another advantage of the present invention that a tensioner according to this invention will be less costly than known prior art tensioners.

Other objects, features and advantages of the present invention will become apparent to the reader of the specification.

SUMMARY OF THE INVENTION

An accessory drive tensioner for an engine according to the present invention comprises a cover adapted to enclose a portion of the engine and a hub carrier formed integrally with the cover. A tensioner arm and wheel assembly is journalled to the hub carrier. The hub carrier preferably comprises a generally annular wall extending from the outer surface of the cover with the wall having an end surface in supporting contact with the tensioner. The hub carrier further comprises a bearing post concentric with the annular wall of the carrier and extending from the outer surface of the engine's cover, with the bearing post being in supporting contact with the tensioner arm. The tensioner arm preferably comprises a flanged hub having a cylindrical center section disposed about the bearing post and a generally planar cover section in contact with the annular wall. A spring means is interposed between the hub carrier and the tensioner arm. The spring may comprise a helically wound spring having a first end secured to the hub carrier and a second end secured to the tensioner arm. The spring is preferably secured to the hub carrier by means of an abutment formed in the annular wall.

According to another aspect of this invention, a method for assembling a tensioner involves first attaching the tensioner arm to a hub carrier located on an engine cover and then releasing a spring means which had been captured on the tensioner.

DETAILED DESCRIPTION OF THE PREFERRED EMBODIMENTS

Figure 1:
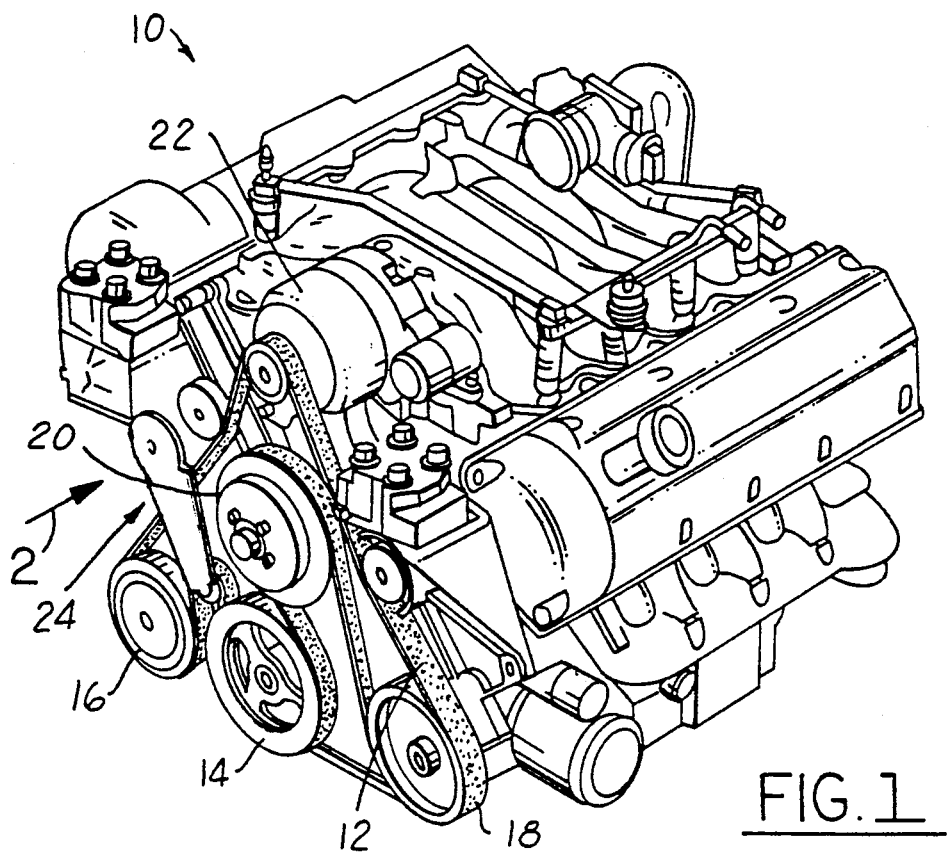
FIG. 1 is a perspective view of an engine having an accessory drive tensioner according to the present invention.
Figure 2:
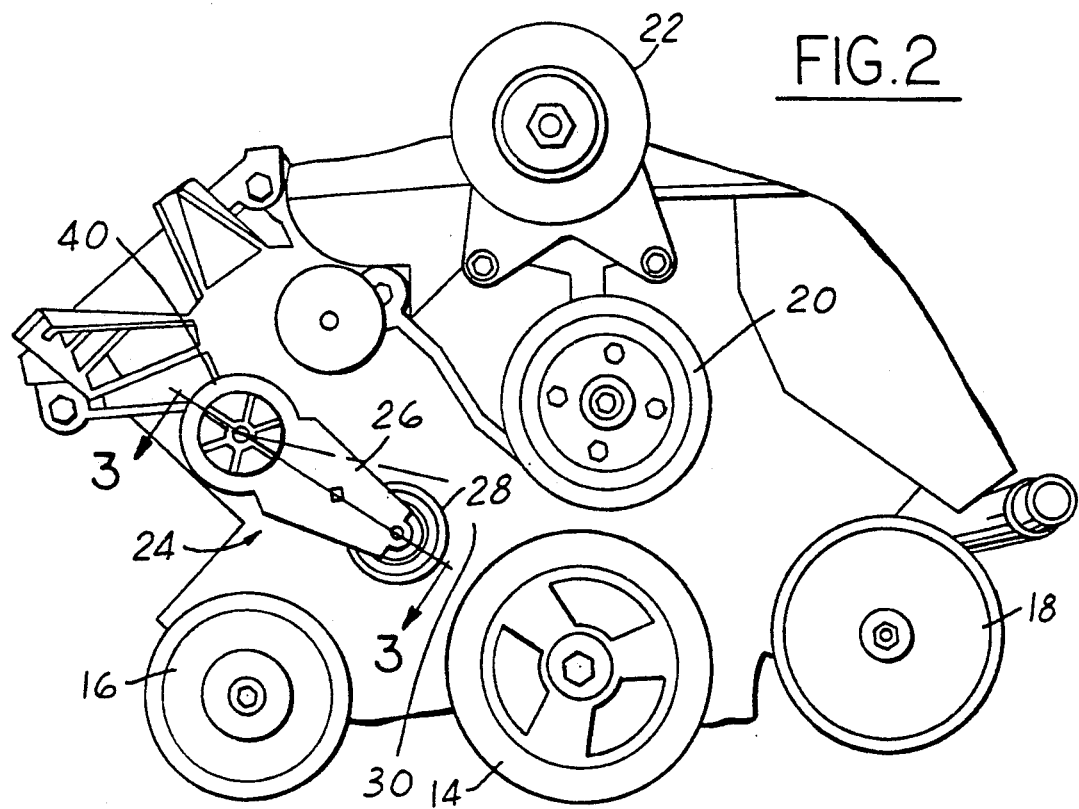
FIG. 2 is a frontal elevation of the engine shown in the direction of arrow 2 in FIG. 1.

As shown in FIG. 1, an accessory drive tensioner according to the present invention is intended for use with an engine of the automotive type. Although the illustrated engine is of a V-type, such as a V6 or V8, those skilled in the art will appreciate in view of this disclosure that a tensioner according to the present invention could be employed with other types of engines, such as those having in-line configurations. FIGS. 1 and 2 illustrate the various accessories driven on engine 10 by means of drive belt 12. Accordingly, air conditioning compressor 16, power steering pump 18, water pump 20 and alternator 22 are all driven by flexible belt 12, which receives power from crankshaft pulley 14, it being understood that the crankshaft pulley rotates with the engine's crankshaft. Although belt 12 is illustrated as being of the serpentine type, those skilled in the art will appreciate in view of this disclosure that a tensioner according to this invention could be employed with other types of dry lubricated drive belts or with wet lubricated belt or chain drive systems.

In order to drive the accessories on engine 10 without belt 12 slipping objectionably, it is necessary that tensioner 24 maintain the belt at a desirable level of tightness. The tensioner does this by rotating arm 26 in the counterclockwise direction, as viewed in FIG. 2, so that wheel 28, which is attached to arm 26, tightens drive belt 12.

Figure 3:
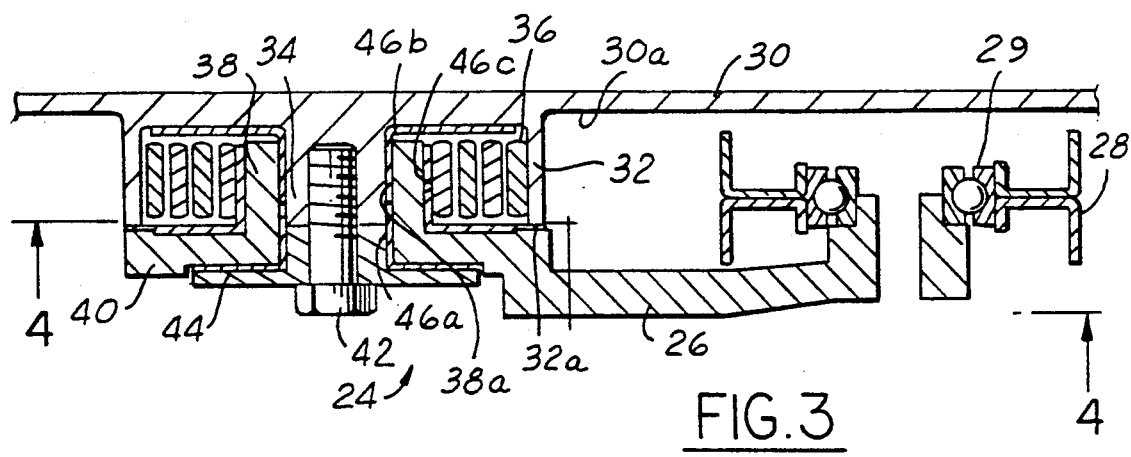
FIG. 3 is a cross-sectional view of the tensioner of the present invention taken along the lines 3—3 of FIG. 2.
Figure 4:
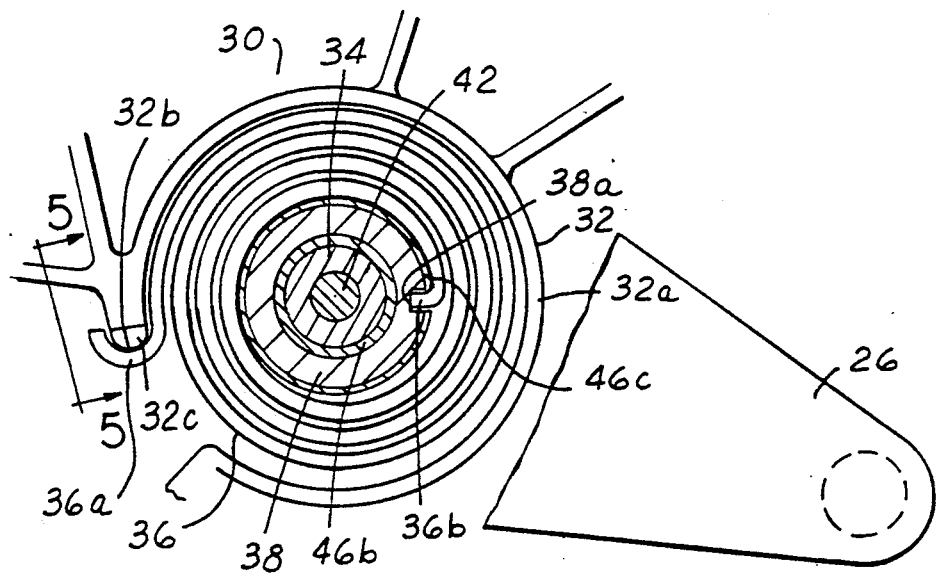
FIG. 4 is a front elevation, partially broken away, of a portion of the tensioner of FIG. 3 taken long the line 4—4 of FIG. 3.

The details of construction of a tensioner according to the present invention are shown in FIGS. 3 and 4. As shown in FIG. 3, tensioner 24 is formed integrally with cover 30, which could comprise a front cover, a timing chain cover, or other type of cover known to those skilled in the art and suggested by this disclosure. Cover 30 has an outer surface 30a, which is generally parallel to the plane defined by drive belt 12. Unlike prior art tensioners, a tensioner according to the present invention being integrated as it is with a cover of the engine, such as front cover 30, will require much less space and will exhibit superior performance characteristics in terms of its response to various vibrations encountered in the operation of the engine. This superior response results from the stiffness of an assembly according to the present invention, which capitalizes upon the strength inherent in the cover assembly and which does not rely upon external brackets bolted to various components of the engine.

As further shown in FIGS. 3 and 4, a tensioner according to the present invention is based on a hub carrier which is formed integrally with cover 30. Accordingly, annular wall 32 extends from outer surface 30a of cover 30 and forms one component part of a housing for a spring means used according to the present invention. Annular wall 32 terminates in annular end surface 32a which performs the important function of providing a bearing surface for supporting the flanged hub of arm 26. As shown in FIG. 3, cover section 40 of arm 26 is supported by surface 32a of annular wall 32. The tensioner arm is further supported by means of bearing post 34, which is concentric with annular wall 32 and which is also integral with cover 30. Bearing post 34 is received within bore 38a, which is formed within cylindrical center section 38. Accordingly, the bearing post is in rotational contact with cylindrical center section 38 which, together with cover section 40, comprise a flanged hub for mounting arm 26. Thus the arm and wheel assembly is journaled upon the hub carrier. Arm 26 has wheel 28 journalled thereon by means of bearing 29. The arm and wheel assembly are retained in contact with annular end surface 32a and bearing post 34 by means of center bolt 42 and retaining washer 44, which are concentric with both cylindrical center section 38 of the arm's flanged hub, as well as being concentric with bearing post 34. In order to promote free rotation of arm 26, a plurality of bearing inserts 46a, 46b, 46c and 46d are provided between the various components illustrated in FIG. 3.

Arm 26 and wheel 28 are biased rotationally in a direction tending to tighten belt 12 by means of helically wound spring 36, which has an outer end 36a in annular wall 32, with the second, or inner, end of the spring 36b fitting within a notch 38a formed within cylindrical center section 38, of the tensioner arm flanged hub. Those skilled in the art will appreciate in view of this disclosure that other types of spring means could be employed with a tensioner according to the present invention. Such additional types could include, without limitation, elastomeric, visco-elastic, hydraulic, or other types of spring or spring/damper means.

Taken together, cover 30, with annular wall 32 and cover section 40, as maintained in an assembly by center bolt 42 and retaining washer 44, provide a housing for spring 36 which not only protects the spring from damage but also assures proper functioning of the tensioner because of the robustness provided by the combined structures of the hub carrier and the flanged hub. More specifically, because forces acting to displace arm 26 and wheel 28 out of the plane of belt 12 are counteracted by equal and opposing forces developed at the interface of cover section 40 and annular end surface 32a, the relatively large bearing diameter of annular end surface 32a and cover section 40 as compared to the small diameter of bearing post 34, assures arm 26 and wheel 28 will be maintained in the proper parallel relationship with respect to drive belt 12 and the various pulleys over which the belt is trained.

It should be recognized that a tensioner according to the present invention will be less costly than conventional units because of the integration of the hub carrier into the front cover. Also, the elimination of conventional bracketry will beneficially yield a smaller package volume.

Figure 5:
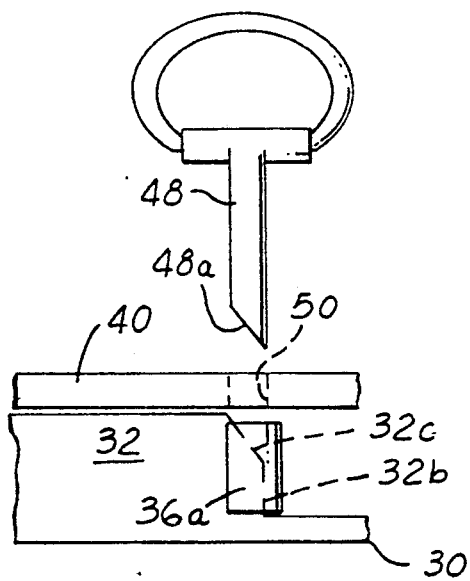
FIG. 5 is an elevation, partially broken away of the tensioner of FIG. 4, taken along the line 5—5 of FIG. 4.

The present tensioner is ideally suited for rapid, convenient installation upon an engine, either during off-line assembly of the front cover, or during dress up of the engine on the final engine assembly line, or even at a vehicle assembly plant. In any case, the tensioner arm and wheel assembly, including spring 36, may be maintained as a discrete subassembly, with outer end 36a of spring 36 being temporarily located by pin 48, which extends through aperture 50 formed in cover section 40 (FIG. 5). As long as pin 48 remains as shown in FIG. 5, spring 36 is captured between the pin and notch 38a formed in the center section of the tensioner arm.

According to a method of the present invention, the tensioner is assembled by first placing the arm which has been pre-assembled with the captured spring into contact with annular wall 32 and bearing post 34. Thereafter, center bolt 42 and retaining washer 44 may be inserted. After the tensioner arm is secured by tightening the center bolt, spring 36 may be released by withdrawing pin 48 from cover section 40.

FIG. 5 illustrates another advantage of the present invention relating to disassembly of the tensioner arm from cover 30. In the event that it becomes necessary to remove the tensioner arm from cover 30, spring 36 should be captured first. This may be accomplished by inserting pin 48 into aperture 50, with the aperture first being aligned with ramp 32c, which is formed in abutment 32b. Pin 48 is inserted such that tapered surface 48a of the pin comes into sliding contact with ramp 38c. When pin 48 is driven home, spring 36 will be captured by the pin and the tensioner arm may be easily disengaged from cover 30.

Those skilled in the art will appreciate in view of this disclosure that various changes and modifications may be made to the tensioner described herein without departing from the scope of the invention as defined by the appended claims.

We claim:

1. An accessory drive tensioner for an automotive engine, comprising:
    a cover adapted to enclose a portion of said engine;
    a hub carrier formed integrally with said cover; and
    a tensioner arm and wheel assembly journalled to said hub carrier.

2. An accessory drive tensioner according to claim 1, wherein said hub carrier comprises a generally annular wall extending from the outer surface of said cover, with said wall having an end surface in supporting contact with said tensioner arm.

3. An accessory drive tensioner according to claim 2, wherein said hub carrier further comprises a bearing post concentric with said annular wall and extending from the outer surface of said cover, with said bearing post being in supporting contact with said tensioner arm.

4. An accessory drive tensioner according to claim 3, wherein said tensioner arm comprises a flanged hub having a cylindrical center section disposed about said bearing post and a generally planar cover section in contact with said annular wall.

5. An accessory drive tensioner according to claim 2, further comprising spring means interposed between said hub carrier and said tensioner arm.

6. An accessory drive tensioner according to claim 5, wherein said spring means comprises a helically wound spring having a first end secured to said hub carrier and a second end secured to said tensioner arm.

7. An accessory drive tensioner according to claim 6, wherein said annular wall further comprises an abutment for securing the first end of said spring.

8. An accessory drive tensioner according to claim 1, wherein said tensioner arm is preassembled with a spring means for biasing said arm rotationally.

9. A drive belt tensioner for controlling the tightness of a belt driven by an automotive engine and used for driving accessories such as an alternator, a power steering pump, and a water pump, comprising:
    a cover adapted to enclose a portion of said engine, with said cover having an outer surface which is generally parallel with the plane defined by said drive belt;
    a hub carrier housing formed integrally with said cover; and
    a tensioner arm and wheel assembly journalled to said hub carrier housing.

10. An accessory drive tensioner according to claim 9, wherein said hub carrier housing comprises a generally annular bearing wall extending from the outer surface of said cover, with said wall having an annular end surface in supporting contact with said tensioner arm.

11. An accessory drive tensioner according to claim 10, wherein said hub carrier housing further comprises a bearing post concentric with said annular wall and extending from the outer surface of said cover, with said bearing post being in supporting contact with said tensioner arm.

12. An accessory drive tensioner according to claim 11, wherein said tensioner arm comprises a flanged hub having a cylindrical center section disposed about said bearing post and a generally planar cover section in contact with said annular wall.

13. An accessory drive tensioner according to claim 10, further comprising spring means interposed between said hub carrier housing and said tensioner arm.

14. An accessory drive tensioner according to claim 13, wherein said spring means comprises a helically wound spring having a first end secured to said hub carrier and a second end secured to said tensioner arm.

15. An accessory drive tensioner according to claim 14, wherein said annular wall further comprises an abutment for securing the first end of said spring.

16. A drive belt tensioner for controlling the tightness of a belt driven by an engine and used for driving accessories such as an alternator, a power steering pump, and a water pump, comprising:
    a cover adapted to enclose a case portion of said engine, with said cover having at least one outer surface which is generally parallel with the plane defined by said drive belt;
    a hub carrier and spring housing formed integrally with said cover and comprising an annular bearing wall extending from said outer surface of said cover, with said wall having an annular end surface adapted to support a tensioner arm, said hub carrier further comprising a bearing post concentric with said annular wall and extending from said outer surface of said cover;
    a tensioner arm and wheel assembly journalled to said hub carrier and spring housing, with said tensioner arm comprising a flanged hub having a hollow cylindrical center section disposed about said bearing post and a generally planar cover section in contact with said annular end surface; and
    spring means disposed within the space defined by said hub carrier and spring housing and said generally planar cover section of said tensioner arm.

17. An accessory drive tensioner according to claim 16, wherein said spring means comprises a helically wound spring having a first end secured to said hub carrier and spring housing and a second end secured to said tensioner arm.

18. An accessory drive tensioner according to claim 17, wherein said annular wall further comprises an abutment for securing the first end of said spring, with the second end of said spring being secured to said cylindrical center section of said flanged hub.

* * * * *